United States Patent
Fisher et al.

(10) Patent No.: US 10,831,396 B2
(45) Date of Patent: Nov. 10, 2020

(54) DATA STORAGE ORGANIZATION BASED ON ONE OR MORE STRESSES

(71) Applicant: Micron Technology, Inc., Boise, ID (US)

(72) Inventors: Ryan G. Fisher, Boise, ID (US); Rahul M. Jairaj, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/224,422

(22) Filed: Dec. 18, 2018

(65) Prior Publication Data

US 2020/0192595 A1    Jun. 18, 2020

(51) Int. Cl.
*G06F 3/06* (2006.01)

(52) U.S. Cl.
CPC .......... *G06F 3/0647* (2013.01); *G06F 3/0604* (2013.01); *G06F 3/0679* (2013.01)

(58) Field of Classification Search
CPC .................................................. G06F 11/3058
See application file for complete search history.

(56) References Cited

U.S. PATENT DOCUMENTS

| | | | |
|---|---|---|---|
| 5,784,328 A | 7/1998 | Irrinki et al. | |
| 6,662,136 B2 | 12/2003 | Lamb et al. | |
| 8,644,074 B2 | 2/2014 | Chang et al. | |
| 9,152,568 B1* | 10/2015 | Seigler | G06F 12/0866 |
| 9,570,147 B2 | 2/2017 | Kim | |
| 10,089,221 B2 | 10/2018 | Walker et al. | |
| 2013/0145079 A1* | 6/2013 | Lee | G06F 12/0246 |
| | | | 711/103 |
| 2013/0290600 A1* | 10/2013 | Tzafrir | G06F 11/004 |
| | | | 711/103 |
| 2015/0089961 A1 | 4/2015 | Duzly et al. | |
| 2016/0139812 A1 | 5/2016 | Zhang | |
| 2016/0188455 A1* | 6/2016 | Patel | G06F 12/0246 |
| | | | 711/154 |
| 2017/0003889 A1 | 1/2017 | Kim et al. | |
| 2017/0351308 A1 | 12/2017 | Rangarajan et al. | |

FOREIGN PATENT DOCUMENTS

KR    10-2016-0086507 A    7/2016

OTHER PUBLICATIONS

International Search Report and Written Opinion from related international application No. PCT/US2019/064352, dated Mar. 27, 2020, 14 pages.

* cited by examiner

*Primary Examiner* — Edward J Dudek, Jr.

(74) *Attorney, Agent, or Firm* — Brooks, Cameron & Huebsch, PLLC

(57) ABSTRACT

A memory sub-system comprises a number of memory components and a processing device configured to move data stored in the number of memory components based, at least partially, on a stress profile corresponding to the number of memory components.

16 Claims, 4 Drawing Sheets

DATA STORAGE ORGANIZATION BASED ON ONE OR MORE STRESSES

TECHNICAL FIELD

Embodiments of the disclosure relate generally to memory sub-systems, and more specifically, relate to data storage organization based on one or more stresses.

BACKGROUND

A memory sub-system can be a storage system, such as a solid-state drive (SSD), universal flash storage (UFS) device, or embedded MultiMediaCard (eMMC) device, among various other storage systems, which can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
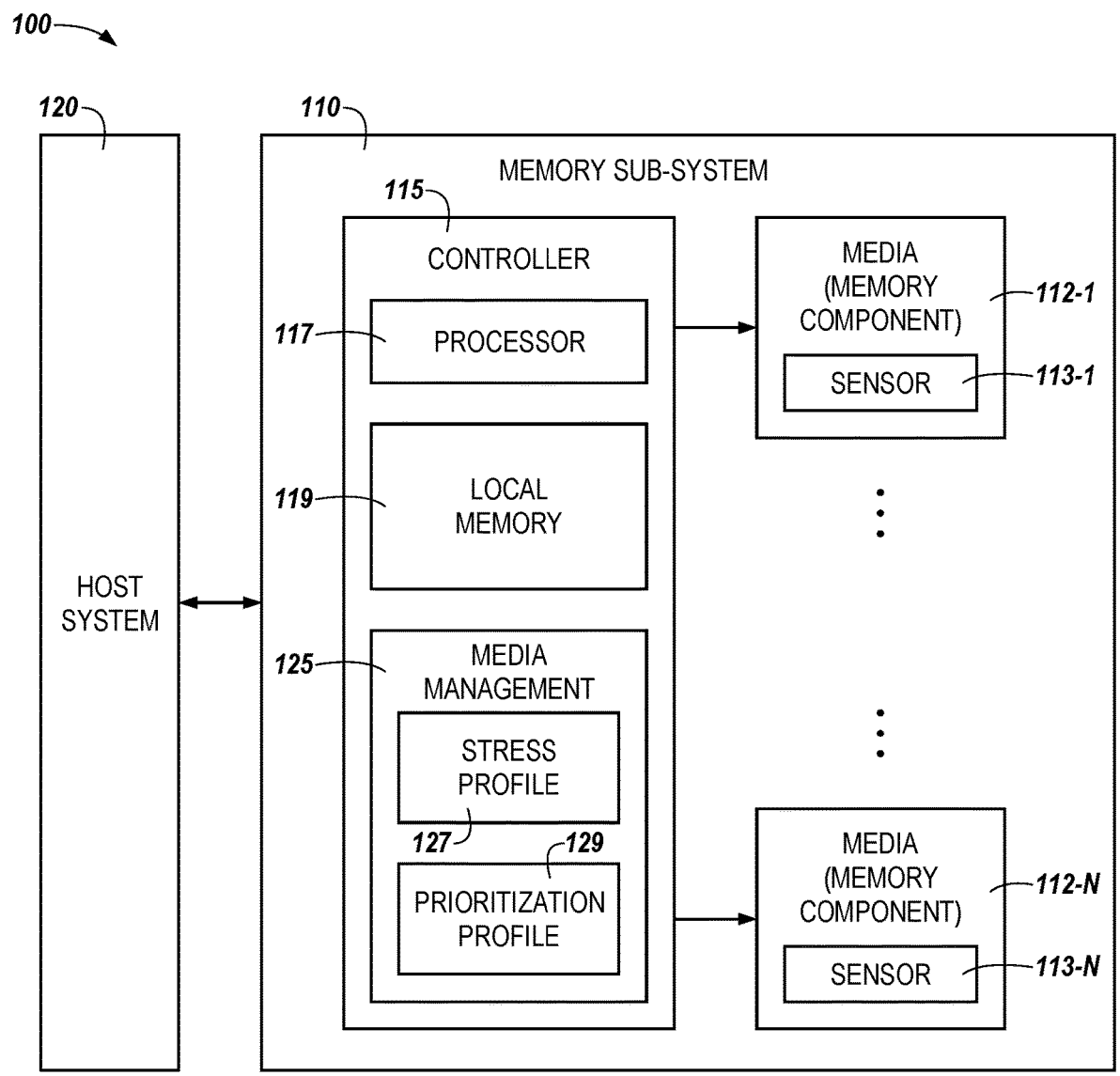
FIG. 1 illustrates an example computing environment that includes a memory sub-system in accordance with some embodiments of the present disclosure.

Aspects of the present disclosure are directed to data organization within a memory sub-system based on one or more stresses. A memory sub-system is also hereinafter referred to as a "memory device." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

A memory sub-system can include multiple memory components that can include different types of media used to store data. Example media types include, but are not limited to, flash based memory and phase change memory. The memory cells can be arranged in arrays having various architectures, which can include both two-dimensional (2D) and three-dimensional (3D) arrays.

Characteristics such as data reliability, endurance, and speed associated with operating memory sub-systems can vary based on a number of factors. Such characteristics can vary among memory components having different media types and/or among memory components having a same media type. One of the factors affecting such characteristics includes storage density. For instance, various memory cells are capable of storing different amounts of data (e.g., quantity of bits) per memory cell. For example, flash based memory can include single level cells (SLCs) configured to store one bit per cell, or multi-level cells (MLCs) configured to store multiple bits per cell. MLCs can include, for example, three-level cells (TLCs) configured to store three bits per cell and quad-level cells (QLCs) configured to store four bits per cell. Accordingly, a QLC memory component has a higher storage density than an SLC memory component. However, in general, cells storing more bits per cell can be less reliable (e.g., more prone to retention loss) and slower (e.g., to read/write) than cells storing fewer bits per cell.

The reliability of memory cells can be improved by using error detection/correction techniques such as error correction code (ECC) schemes, which may utilize soft data, and redundant array of independent NAND (RAIN) protection schemes. However, such techniques utilize time and resources that can reduce system performance and lead to a reduced Quality of Service (QoS). Therefore, it can be beneficial to reduce the amount of times error correction schemes are used while maintaining data integrity within a system.

The physical location at which data is stored within a memory sub-system can also affect the integrity of the data. For instance, stresses such as thermal and/or mechanical stresses can be different at various locations within a computing environment. As an example, temperature differences (e.g., changes) can affect data retention. For instance, heat can lead to accelerated data retention loss within flash based memory by causing increased shifts in threshold voltages to which cells are programmed. Accordingly, memory components (e.g., dies, chips, etc.) closer to physical components that produce heat, such as processors, controllers, capacitors, batteries, etc., within a system can be more prone to data retention loss as compared to memory components located further from such physical components. Additionally, the thermal profiles of memory subsystems can vary widely since the quantity and physical organization (e.g., layout) of memory components can differ among different systems.

Thermal sources external to a particular memory sub-system can also affect the thermal profile of, and therefore data retention within, the sub-system. For example, the location of memory components with respect to a vehicle engine or other external heat source, such as the sun, can have an impact on data retention within the memory components of the memory sub-system.

In conventional computing environments, the physical locations at which data is stored within a memory sub-system is not determined based on stress factors such as thermal stress and/or mechanical stress within the system. Additionally, the physical locations of data within conventional memory sub-systems is not changed responsive to such stress factors internal and/or external to the system. Therefore, such conventional memory sub-systems are not able to adjust where data is stored based on changes to a stress profile corresponding to the system. Accordingly, such systems are not capable of organizing data physically within the memory sub-system according to particular system priorities (e.g., a prioritization profile). The system priorities can be based on, for example, a data type (e.g., SLC, TLC, QLC) and/or an expected storage duration (e.g., short term or long term). For instance, it may be beneficial to organize data needing a longer term retention capability in physical locations having a lower relative temperature and to store data needing a relatively shorter term retention in physical locations having a higher relative temperature. Responsive to changes in the thermal profile of the sub-system, conventional sub-systems would not be able to move data to different physical locations to account for the temperature changes.

Aspects of the present disclosure address the above deficiencies by providing a memory sub-system that can organize data physically within and/or among the constituent memory components based on one or more stresses associated with the memory sub-system. Various embodiments can include determining a change in a stress profile associated with a memory subsystem and moving data within the memory sub-system responsive to the determined change based on a prioritization profile. Embodiments can provide benefits such as improving a system QoS, improving bit error rates, reducing the use of error recovery schemes, among various other benefits.

FIG. 1 illustrates an example computing environment 100 that includes a memory sub-system 110 in accordance with some embodiments of the present disclosure. The memory sub-system 110 can include media, such as memory components 112-1 to 112-N. The memory components 112-1 to 112-N can be volatile memory components, non-volatile memory components, or a combination of such. In some embodiments, the memory sub-system 110 is a storage system. Example storage systems include, but are not limited to, a SSD, a universal flash storage (UFS) device, and an embedded MultiMediaCard (eMMC) device. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112-1 to 112-N when the memory sub-system 110 is coupled with the host system 120 by the PCIe interface. The physical host interface can provide an interface for passing control, address, data, and other signals between the memory sub-system 110 and the host system 120.

The memory components 112-1 to 112-N can include any combination of the different types of non-volatile memory components and/or volatile memory components. An example of non-volatile memory components includes a negative-and (NAND) type flash memory. Each of the memory components 112-1 to 112-N can include one or more arrays of memory cells such as single level cells (SLCs) or multi-level cells (MLCs) (e.g., triple level cells (TLCs) or quad-level cells (QLCs)). In various embodiments, the memory components include cells operable in both an SLC mode and a MLC mode. Each of the memory cells can store one or more bits of data (e.g., data blocks) used by the host system 120. The memory components 112-1 to 112-N can each be an individual die, chip, or multi-chip package (MCP). Although non-volatile memory components such as NAND type flash memory are described, the memory components 112-1 to 112-N can be based on any other type of memory such as a volatile memory. In some embodiments, the memory components 112-1 to 112-N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells (e.g., 3D XPoint).

In various embodiments, the memory components 112-1 to 112-N can include one or more sensors 113-1 to 113-N (referred to collectively as 113). The sensors 113 can be various types of sensors such as thermal sensors, strain sensors, pressure sensors, light sensors, accelerometers, etc. As described further herein, the sensors 113 can be used to measure physical stresses associated with the memory sub-system 110. As an example, the sensors 113 can be temperature sensors. In various embodiments, the sensors 113 can be used to determine changes in stresses associated with the memory sub-system and the data stored therein can be moved based on the determined changes.

The memory system controller 115 (hereinafter referred to as "controller") can communicate with the memory components 112-1 to 112-N to perform operations such as reading data, writing data, or erasing data at the memory components 112-1 to 112-N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112-1 to 112-N. As shown in FIG. 1, the controller 115 can include a media management component 125 which can be responsible for various operations such as wear leveling operations, garbage collection operations, error detection and error-correcting code (ECC) operations, encryption operations, caching operations, and address translations between a logical block address and a physical block address that are associated with the memory components 112-1 to 112-N. The controller 115 can further include host interface circuitry to communicate with the host system 120 via the physical host interface. The host interface circuitry can convert the commands received from the host system into command instructions to access the memory components 112-1 to 112-N as well as convert responses associated with the memory components 112-1 to 112-N into information for the host system 120.

In various embodiments, the media management component 125 can be responsible for organizing data stored in the memory components 112-1 to 112-N base on a stress profile 127 and a prioritization profile 129. As described further below, the stress profile 127 can include data in the form of a stress map indicating stresses within the memory sub-system 110 as measured by sensors 113. For example, sensors 113 can be temperature sensors and the stress profile 127 can be a temperature map generated by the temperature sensors. The prioritization profile 129 can be maintained by the controller 115 and can indicate how data is prioritized within the memory sub-system 110. For example, the prioritization profile 129 can indicate a data type assigned to data stored (or to be stored) in the memory components 112-1 to 112-N. The data type can refer to an operational mode corresponding to data (e.g., whether the data is to be stored as SLC or QLC data). For instance, it can be beneficial to prioritize the storing of data requiring higher relative reliability in SLC mode as compared to QLC mode, since QLC mode is generally more susceptible to bit errors due to temperature changes. The prioritization profile 129 can also indicate a storage term corresponding to data stored (or to be stored) in the memory components 112-1 to 112-N). For instance, it may be useful to prioritize data requiring relatively longer term retention over data requiring shorter term retention.

In various embodiments, the controller 115 can be configured to determine where to store incoming data (e.g., data received from the host 120) based on the stress profile 127 and prioritization profile 129. For instance, the stress profile 127 can be updated based on measurements of the sensors 113, and the physical location at which the incoming data is to be stored can be based on the updated stress profile 127. The actual physical location at which the data is to be stored can also be based on the prioritization profile 129. For instance, if the incoming data requires prioritization as highest reliability and longest term storage retention, then the data may be written as SLC data to a particular memory component 112-1 to 112-N having a lowest temperature. If the incoming data has a lower priority (e.g., relatively lower reliability requirement and/or short term retention), then the data may be written as QLC data to a particular memory component 112-1 to 112-N having a higher temperature (as indicated by stress profile 127).

In various embodiments, the controller 115 can also be configured to move data stored in the memory components 112-1 to 112-N. For instance, the media management component 125 can move data from one physical location to a different physical location based on the stress profile 127 and prioritization profile 129 as a background operation (e.g., transparent to the host 120). For instance, similar to other background operations such as garbage collection, the controller 115 can relocate data stored within the memory components 112-1 to 112-N responsive to determined changes to the stress profile 127 and/or prioritization profile 129. As an example, the thermal profile of a system can change due to various factors internal and external to the system. Such internal factors can include, for example, temperature increases near processors, capacitors, etc. due to increased workload. External factors affecting the thermal profile might include heat from the sun, heat from an automotive engine (or other automotive components), heat from other external computing systems such as other servers in rack system, etc. As described herein, organizing data within a system based on a stress profile 127 and prioritization profile 129 can be useful for optimizing bit error rates and data retention terms, among other benefits.

Figure 2:
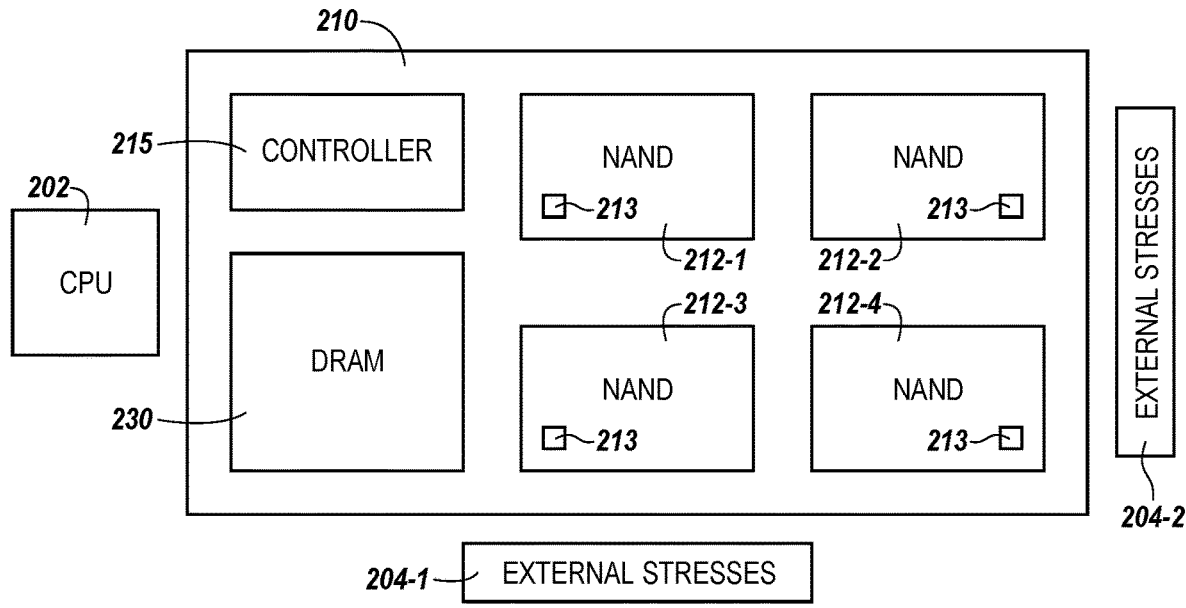
FIG. 2 is a block diagram illustrating an example physical layout of a memory sub-system including both internal and external sources of stress in accordance with some embodiments of the present disclosure.

FIG. 2 is a block diagram illustrating an example physical layout of a memory sub-system 210 including both internal and external sources of stress in accordance with some embodiments of the present disclosure. The memory sub-system 210 can be analogous to the sub-system 110 described in FIG. 1. In this example, the memory sub-system 210 includes a system controller 215, a DRAM resource, and four NAND memory components 212-1, 212-2, 212-3, and 212-4 (referred to collectively as memory components 212).

The memory components 212 include respective stress sensors 213, which can be multiple sensors including temperature sensors, light sensors, pressure sensors, etc. that can measure physical stresses within the memory sub-system 210. The controller 215 and DRAM 230 represent internal sources of stress. In a number of examples, the sensors 213 can be temperature sensors with the measured stress being temperature (e.g., heat). The example shown in FIG. 2 includes a number of external stresses including a CPU 202 and a number of other external stresses 204-1 and 204-2. Using heat as an example, the external stresses 204-1 and 204-2 can be heat from direct sunlight, heat from a battery power source, heat from an automotive engine of a vehicle in which the sub-system 210 is deployed, etc.

As one of ordinary skill in the art will appreciate, a memory sub-system 210 such as an SSD can have a variety of physical layouts. For instance, the locations and quantities of the various system components (e.g., 215, 230, 212, 202, 204-1, 204-2) can vary among different SSDs. Accordingly, each SSD can have a different stress profile (e.g., thermal profile) associated therewith. Additionally, the stress profile associated with a particular memory sub-system 210 is variable based on factors such as the current workload, physical location of the sub-system, etc.

Various embodiments of the present disclosure provide memory sub-systems (e.g., 210) capable of adjusting the physical organization of data storage based on a stress profile associated with the memory sub-system in order to mitigate the negative effects of stresses such as temperature. The physical organization (or changes thereto) of the data can be in accordance with a prioritization profile associated with the memory sub-system.

As one example, consider a change in the thermal profile of an SSD 210 based on an increase in temperature due to external stress 204-2. The increased temperature can be measured by the temperature sensors 213 of the NAND components 212. The resulting increase in temperature (due to external stress 204-2) will be greater at components 212-2 and 212-4 as compared to components 212-1 and 212-3 due to their closer proximity to heat source 204-2. Depending on a prioritization profile (e.g., prioritization profile 129 shown in FIG. 1) associated with the SSD 210, the controller 215 may move data stored in the memory components 212-2 and/or 212-4 to the now relatively cooler memory components 212-1 and 212-3, which can reduce the negative effects due to the increased heat caused by stress 204-2.

Embodiments are not limited to the example shown in FIG. 2. For example, the memory components 212 can be memory components other than NAND flash memory components. Also, embodiments can include more or less than four memory components, which may exist on one or both sides of a PCB, for example.

Figure 3:
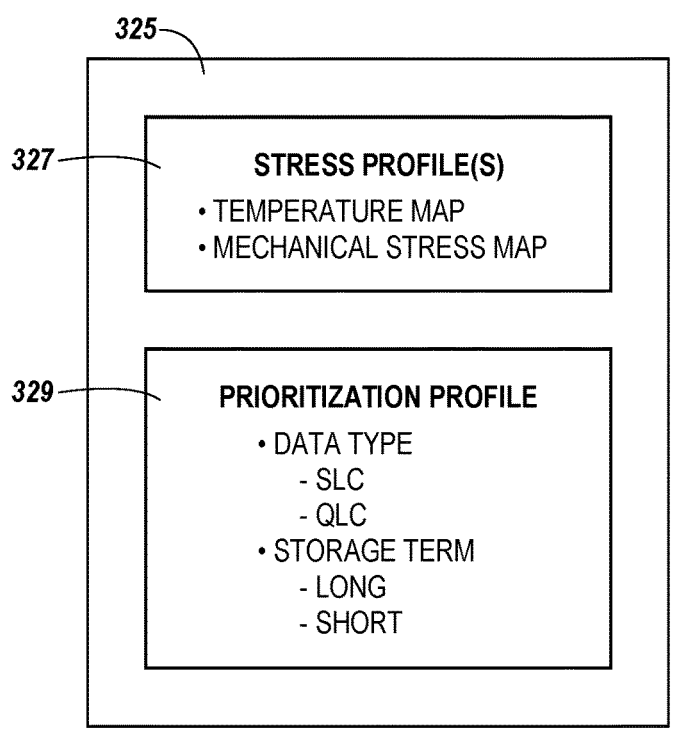
FIG. 3 illustrates example stress and prioritization profiles associated with a media management component in accordance with some embodiments of the present disclosure.

FIG. 3 illustrates example stress and prioritization profiles associated with a media management component 325 in accordance with some embodiments of the present disclosure. The media management component 325 can be analogous to the media management component 125 described in FIG. 1. In this example, the stress profile 327 provides a temperature map associated with a memory sub-system such as system 210 shown in FIG. 2. The temperature map can be generated based on measurements from a number of temperature sensors. The temperature sensors can be located on each of a number of memory components (e.g., NAND die); however, embodiments are not so limited. For example, multiple temperature sensors can be located on an individual die, and temperature sensors may be positioned at various other locations within a memory sub-system. The stress profile 327 can include a mechanical stress map, which can be, for example, a map of pressure stress associated with the memory sub-system. In various embodiments, changes to one or more stress profiles associated with a memory sub-system can be used to determine how to physically organize data within and/or among the constituent memory components (e.g., where to store and/or where to move the data).

In this example, the prioritization profile 329 indicates how data is prioritized within a memory sub-system based on data type and storage term. Although the prioritization profile 329 in this example is based on two data types (e.g., SLC and QLC) and on two storage terms (e.g., long and short), embodiments are not so limited. For example, the prioritization profile 329 can include more or different data types and more or different storage terms. Additionally, the prioritization profile 329 can include prioritization factors other than data type and storage term.

Consider an example in which a memory sub-system such as SSD 210 shown in FIG. 2 includes NAND flash memory components operable in both an SLC mode and a QLC mode. In general, in order to reduce uncorrectable errors (e.g., UECC events), storing data in SLC mode can be prioritized over storing data in QLC mode. However, to utilize the increased storage density, it is useful to store data in QLC mode. The reliability of the data stored in QLC mode can be improved by accounting for the negative effects of increased temperature. For example, storing QLC data in memory components exposed to lower temperatures can increase the data retention term of the QLC data as compared to QLC data stored in memory components exposed to higher temperatures. As such, the reliability of data stored in an SSD comprising NAND memory components can be improved by moving data within and/or among the memory components responsive to changing temperature conditions within the SSD.

Prioritization schemes can be based on a desire to reduce UECC events, NAND soft data usage, and/or RAIN recovery events, for example, in order to improve Quality of Service. Various embodiments account for temperature differences and/or temperature changes within a memory sub-system in order to reduce the negative effects temperature can have on reliability and retention. For instance, the example prioritization profile 329 can include prioritizing the storing of QLC data having a relatively long storage term in a memory component exposed to a least amount of thermal stress (e.g., lowest temperature). In contrast, SLC data having a relatively short storage term can be stored in (or moved to) a memory component exposed to a greatest amount of thermal stress (e.g., highest temperature). In this example, QLC data having a relatively short storage term can be prioritized over SLC data having a relatively long storage term. For example, the short term QLC data is stored in memory components exposed to lower temperatures than the temperatures to which the memory components storing long term SLC data are exposed. In this manner, the usage of the memory components can be optimized for reducing UECC events while maintaining a mixture of SLC and QLC data.

Figure 4:
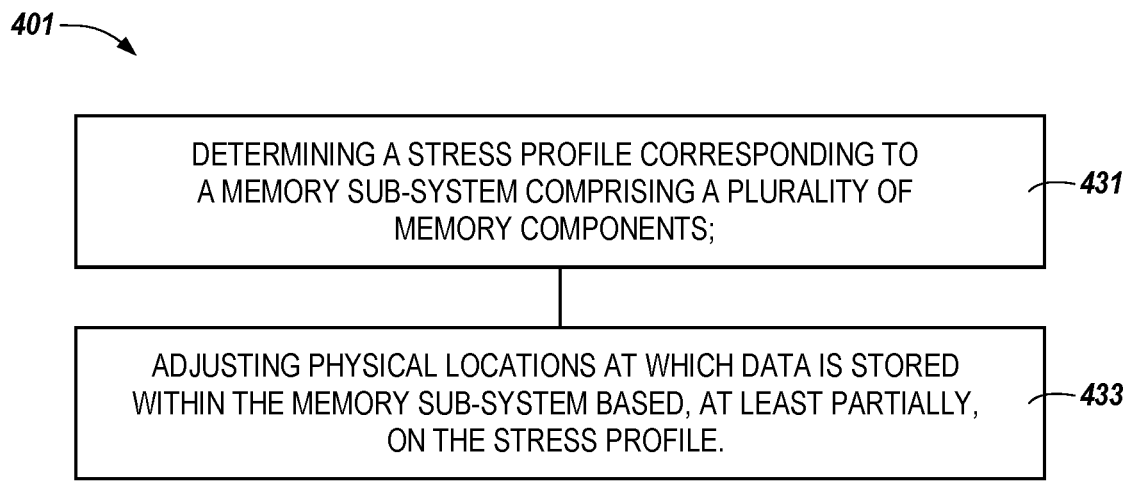
FIG. 4 is a flow diagram of an example method for data organization based on one or more stresses in accordance with some embodiments of the present disclosure.

FIG. 4 is a flow diagram of an example method for data organization based on one or more stresses in accordance with some embodiments of the present disclosure. The method 401 can be performed by processing logic that can include hardware (e.g., processing device, circuitry, dedicated logic, programmable logic, microcode, integrated circuit, etc.) software (e.g., instructions executed by a processing device), or a combination of thereof. In some embodiments, the method 401 can be performed by a media management component such as the media management component 125 of FIG. 1. Although shown in a particular sequence or order, unless otherwise specified, the order of the processes of the method 401 can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 431, the processing device (e.g., media management component 125 in FIG. 1) determines a stress profile corresponding to a memory sub-system (e.g., 110) comprising a plurality of memory components (e.g., 112-1 to 112-N). A stress profile can include parameters such as locations of stress, amounts of stress, and types of stress within a system, for example. The stress profile can be, for instance, a thermal profile, which can be in the form a thermal map determined by a number of temperature sensors (e.g., 113). A thermal map can indicate temperatures and/or relative temperature differences at various locations. The stress profile can also be a mechanical stress profile among other types of stress profiles associated with a system. As one example, a mechanical stress profile may indicate locations having high relative mechanical stress level, which may indicate areas prone to errors.

At block 433, the processing device component adjusts physical locations at which data is stored within the memory subsystem based, at least partially, on the stress profile (e.g., thermal profile). The data can be moved within the system responsive to a determined change in the stress profile. For example, the data can be relocated from a source location to a destination location based on an increased temperature at the source location.

In a number of embodiments, the physical locations at which data is stored within the memory subsystem is adjusted based, at least partially, on a prioritization profile (e.g., 329) corresponding to the memory sub-system. The prioritization profile can be based on a data type and a storage term, for example. In various embodiments, the physical locations at which data is stored within the memory sub-system is adjusted, based on the stress profile, to reduce an uncorrectable error correction code rate.

In various embodiments, the media management component (e.g., 125) can determine the physical locations at which data is to be stored within the memory subsystem based, at least partially, on the stress profile. That is, embodiments can include determining where among the memory components of the SSD data received from a host is to be stored and/or embodiments can include moving data previously stored in the memory components of the SSD to different locations (e.g., as a background process) based on the stress profile and/or prioritization profile.

Figure 5:
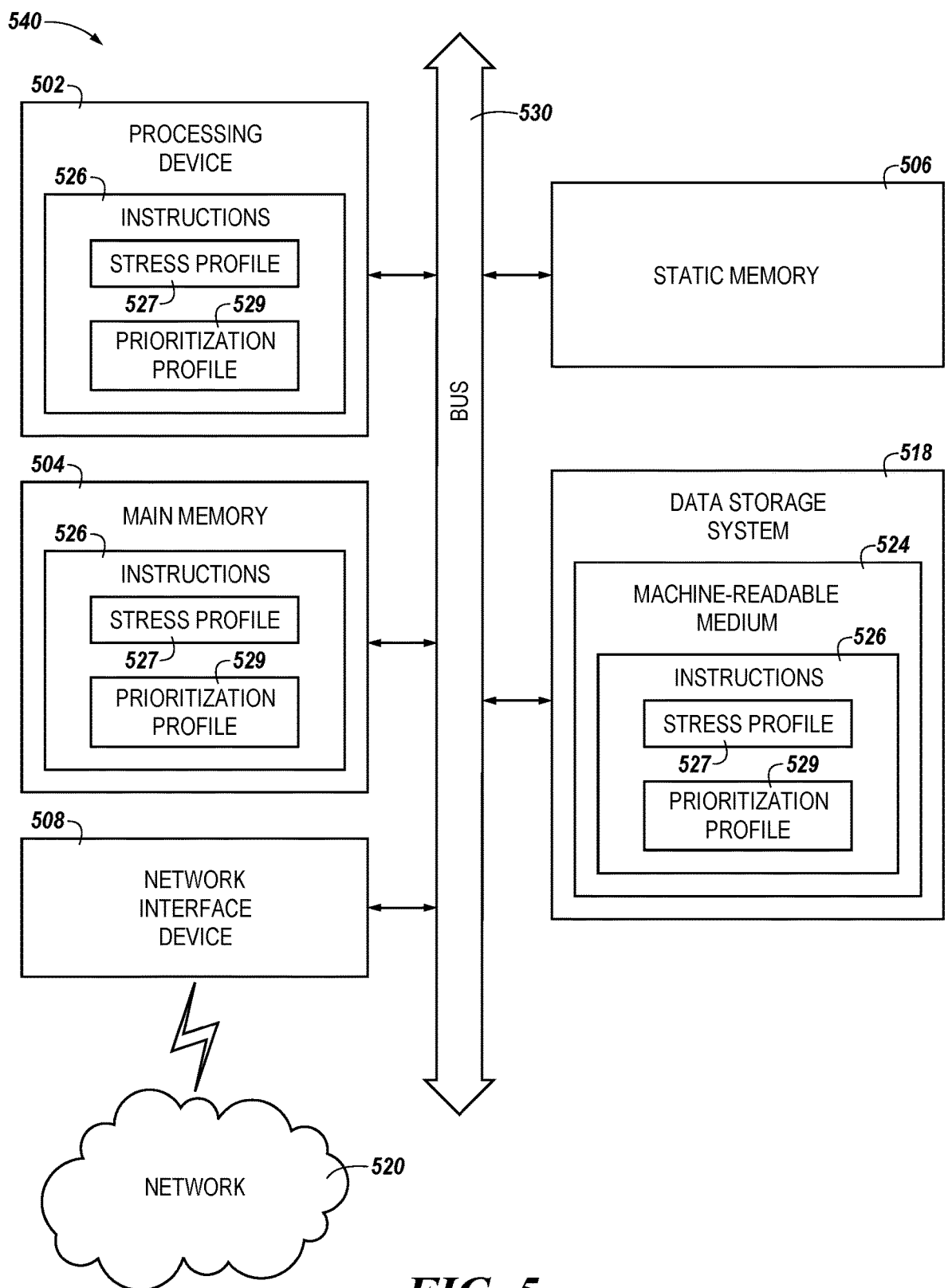
FIG. 5 is a block diagram of an example computer system in which embodiments of the present disclosure can operate.

FIG. 5 is a block diagram of an example computer system 540 in which embodiments of the present disclosure can operate. System 540 is one example within which a set of instructions, for causing a machine to perform any one or more of the methodologies discussed herein, can be executed. In some embodiments, the computer system 540 can correspond to a host system (e.g., the host system 120 of FIG. 1) that includes, is coupled to, or utilizes a memory sub-system (e.g., the memory sub-system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 540 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 540 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 540, the main memory 504 and the processing device 502 also constituting machine-readable storage media. The machine-readable storage medium 524, data storage system 518, and/or main memory 504 can correspond to the memory sub-system 510 of FIG. 1.

In one embodiment, the instructions 526 include instructions to implement functionality corresponding to stress profile 527 and prioritization profile 529, which may correspond to profiles 127 and 129, respectively, of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a", "an", or "a number of" can refer to one or more of something, and "a plurality of" can refer to more than one of such things. For example, a memory device can refer to one or more memory devices, and a plurality of memory devices can refer to two or more memory devices. Additionally, the designator "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a number of memory components; and
a processing device configured to:
  move data stored in the number of memory components based, at least partially, on a stress profile corresponding to the number of memory components and on a prioritization profile, wherein the prioritization profile is based on:
    a data type including whether the data is stored as single level cell data or as multilevel cell data; and
    a storage term; and
  determine a destination location for the data to be moved based at least on whether the data is stored as single level cell data or as multilevel cell data.

2. The system of claim 1, wherein the stress profile comprises a thermal profile as measured by a number of temperature sensors within the system.

3. The system of claim 2, wherein the number of temperature sensors comprise at least one temperature sensor local to each respective one of the number of memory components.

4. The system of claim 2, wherein the thermal profile is determined based on thermal sources internal to the system and on thermal sources external to the system.

5. The system of claim 1, wherein the processing device is further configured to:
receive a command to write data to the number of memory components; and
determine a location within the number memory components to which the data is to be written based on the stress profile.

6. The system of claim 1, wherein the system comprises a storage system and the number of memory components comprise respective NAND flash memory components.

7. The system of claim 6, wherein the number of NAND flash memory components each comprise a plurality of NAND dies associated with respective temperature sensors used to determine the stress profile.

8. The system of claim 6, wherein the storage system comprises one of:
a solid state drive (SSD);
a universal flash storage (UFS) device; or
an embedded MultiMediaCard (eMMC) device.

9. The system of claim 1, wherein:
the system is a storage system coupled to an external host processor;
the processing device is located on a controller of the storage system; and
the controller is configured to write data received from the external host processor to a particular location among the number of memory components based on the stress profile.

10. The system of claim 1, wherein:
the system is a storage system coupled to an external host processor;
the processing device is located on a controller of the storage system; and
the moving of the data stored in the number of memory components based, at least partially, on the stress profile is performed by the controller as a background process.

11. A method, comprising:
determining a stress profile corresponding to a memory sub-system comprising a plurality of memory components; and
adjusting physical locations at which data is stored within the memory sub-system based, at least partially, on the stress profile and on a prioritization profile corresponding to the memory sub-system;
wherein the prioritization profile is based on:
  a data type including whether the data is stored as single level cell data or as multilevel cell data; and
  a storage term; and
wherein adjusting physical locations at which data is stored within the memory sub-system based on the prioritization profile includes determining where to move the data based on whether the data is single level cell data or multilevel cell data.

12. The method of claim 11, wherein the stress profile is a thermal profile corresponding to the memory sub-system, and wherein the method comprises moving data stored within the memory subsystem responsive to a determined change in the thermal profile.

13. The method of claim 12, wherein the change in the thermal profile indicates an increase in temperature to a particular memory component, and wherein the method further comprises, responsive to data stored in the particular memory component being multilevel cell data, moving the multilevel cell data to a different memory component determined to have a lower temperature than the particular memory component.

14. A non-transitory computer readable storage medium comprising instructions that, when executed by a processing device, cause the processing device to:
   determine a stress profile corresponding to a memory sub-system comprising a plurality of memory components;
   determine a prioritization profile corresponding to the memory sub-system, wherein the prioritization profile is based on a data type that includes whether the data is stored as single level cell data or as multilevel cell data; and
   determine physical locations at which data is to be stored within the memory sub-system based, at least partially, on the stress profile; and
   adjust physical locations at which data is stored within the memory sub-system based on the prioritization profile, wherein adjusting the physical locations at which data is stored includes determining where to move the data based on whether the data is single level cell data or multilevel cell data.

15. The non-transitory computer readable storage medium of claim 14, wherein the processing device is part of a controller of the memory sub-system, and wherein the controller is configured to receive the data from a host processor to which the memory sub-system is coupled.

16. The non-transitory computer readable storage medium of claim 14, wherein the stress profile is a thermal stress profile, and wherein the non-transitory computer readable medium further comprises instructions executable to, as a background operation, move the data stored within the memory sub-system from a first physical location to a different physical location responsive to a determined change in the thermal stress profile.

* * * * *